(12) United States Patent
Bharadwaj et al.

(10) Patent No.: US 8,959,740 B2
(45) Date of Patent: Feb. 24, 2015

(54) SHAPE ADJUSTMENT SYSTEM

(76) Inventors: Shravan Bharadwaj, San Jose, CA (US); Derrick Tek-Kien Jue, San Francisco, CA (US)

(*) Notice: Subject to any disclaimer, the term of this patent is extended or adjusted under 35 U.S.C. 154(b) by 246 days.

(21) Appl. No.: 13/597,221

(22) Filed: Aug. 28, 2012

(65) Prior Publication Data
US 2013/0133167 A1    May 30, 2013

Related U.S. Application Data

(60) Provisional application No. 61/564,674, filed on Nov. 29, 2011.

(51) Int. Cl.
*B23Q 17/00* (2006.01)
*B21B 15/00* (2006.01)
*G05D 23/00* (2006.01)

(52) U.S. Cl.
USPC .................. 29/407.09; 29/33 R; 700/279

(58) Field of Classification Search
USPC .............. 29/407.01, 407.09, 407.04, 407.05, 29/407.1, 407.08, 464, 466, 467, 468, 712, 29/721, 281.5, 515, 524, 33 R; 700/279; 702/127, 150
See application file for complete search history.

(56) References Cited

U.S. PATENT DOCUMENTS 4,627,979 A * 12/1986 Lynch ............................ 424/54
2010/0108450 A1   5/2010 Suckfull et al.
2013/0274931 A1 * 10/2013 Bharadwaj et al. ........... 700/279

FOREIGN PATENT DOCUMENTS

EP             520173 A2    12/1992

* cited by examiner

*Primary Examiner* — John C Hong
(74) *Attorney, Agent, or Firm* — Womble Carlyle Sandridge & Rice LLP

(57) ABSTRACT

Systems which may be employed to adjust the shape of a computer housing are provided. The systems may include a measurement apparatus that measures the positions of points on the housing. A determining apparatus may determine an offset between the position of the points and reference values. An adjustment apparatus may apply force to the computer housing with actuators based on the offset at each of the points. This process may be repeated or otherwise continued until the offset is within a predetermined range of acceptable values. Related methods, assemblies, and a non-transitory computer readable medium are also provided.

24 Claims, 10 Drawing Sheets

SHAPE ADJUSTMENT SYSTEM

CROSS-REFERENCE TO RELATED APPLICATIONS

This application claims the benefit of U.S. Provisional Application No. 61/564,674, filed Nov. 29, 2011, which is entirely incorporated herein by reference.

TECHNICAL FIELD

The present disclosure relates generally to methods and systems for adjusting the shape of items, and more particularly to methods and systems for adjusting the shape of a computer housing such that it properly mates with a display cover.

BACKGROUND

Sophisticated computers, terminals, televisions, and other devices that utilize display screens are developing at a rapid rate. In such competitive markets with many brands and providers, there is an ever-present demand for improved and/or distinguished appearances, functionalities, and aesthetics in the newest computers and other similar devices. One area that continually receives great attention for improved and distinguished appearances in such devices involves visual outputs, which can include display screens, lights and other variable visual indicators. As consumer products grow more complex with greater capabilities, and with so many providers and competing products to choose from, however, it becomes increasingly difficult to provide products having display screens that are distinguished and eye-catching, yet uncluttered and aesthetically pleasing.

For example, significant strides have been made in recent years with respect to display screens for laptop computers. Newer technologies have resulted in laptop computer makers being able to mass produce display screens that are clearer, thinner and larger in area, while producing less heat than in earlier models. In addition, the materials used to house and support laptop display screens, typically in one half of a clamshell type arrangement, have become stronger and arranged better in recent years. This enables the ability to use less plastic or other material to support and "frame" the display screen, which can then result in more area dedicated to the display screen itself and a more aesthetic display appearance.

Another more particular example of a distinguished and aesthetically pleasing large display screen presentation can be found with respect to the iMac® personal computer made by Apple Inc. of Cupertino, Calif. In this display presentation, a large display screen is secured within a computer housing having a back, bottom, relatively thin sides and top, and a large opening in the front that comprises over 75% of the frontal area. A display cover glass is positioned into and held in place in a set back recess in the frontal opening area of the computer housing specifically designed to secure the cover glass, such that the display screen is visible therethrough. An inked mask around the display cover glass edge, rounded housing corners and a metallic finish augment the overall appearance. The end result is an aesthetically pleasing look dominated by a relatively large display screen that is visible to the user through a display cover glass and positioned within a computer housing that does not require substantially more height or width than the display screen itself.

While many designs and techniques used to present a display screen have generally worked well in the past, there is always a desire to improve on the accuracy of the assembly thereof, such that improved functionality and/or appearance is provided.

SUMMARY

The present disclosure provides systems and related methods and computer code for adjusting the shape of an item such as a computer housing. For example, in an assembled computer, cover glass may be coupled to the computer housing and hence the shape and dimensions of the computer housing may affect the interface therebetween. By way of further example, light leakage may occur at edges of the computer housing between the computer housing and the cover glass if the dimensions and shape of the computer housing differ from the specifications.

The systems may include a measurement apparatus that measures the position of points on the computer housing. By comparing the positions of the points to reference values, a determining apparatus may determine an offset therebetween. Once the offsets are known, an adjustment apparatus may apply force to the computer housing (or other item) based on the offsets. This may occur (e.g., concurrently or sequentially) until the offset at each of the points falls within a predetermined range of acceptable values. Accordingly, the shape of the computer housing (or other item) may be adjusted to meet the desired specifications.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed systems and methods for adjusting a display cover to computer housing interface for a personal computer or other device having a display screen. These drawings in no way limit any changes in form and detail that may be made to the disclosure by one skilled in the art without departing from the spirit and scope of the disclosure.

DETAILED DESCRIPTION

Figure 1:
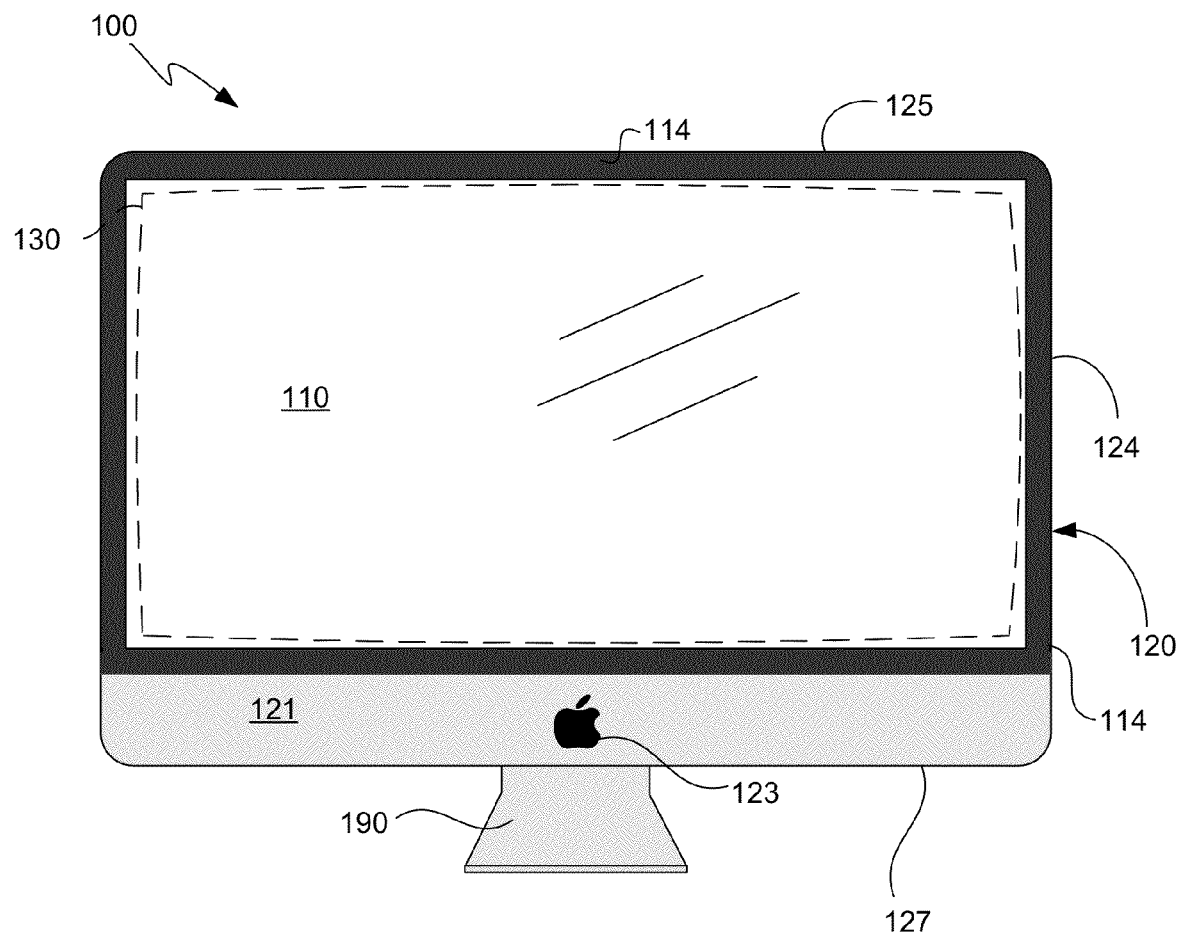
FIG. 1 illustrates a front view of a prior art computing device having a display screen that extends to distal edges of a computer housing according to one embodiment of the present disclosure.

Exemplary applications of apparatuses and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting; such that other embodiments may be used, and changes may be made without departing from the spirit and scope of the disclosure.

The disclosure relates in various embodiments to a display cover to housing interface system for a device having a visual display, and related systems and methods for adjusting the interface therebetween. Various types of displays that can be associated with such an interface system and associated device can include, for example, cathode ray tube ("CRT"), liquid crystal display ("LCD"), or plasma displays, as well as various light emitting diode ("LED") arrangements or any other device used to present a visual display to a viewer. Associated devices having such a visual display and interface system can be, for example, a television, terminal, monitor or integrated computing device, among other possibilities that have display screens. One particular example of an integrated computing device can be an iMac® personal computer made by Apple Inc., as well as other similar integrated computing devices. Other possibilities that may utilize such an interface system can include various handheld media devices, such as the iPod® and iPhone® personal handheld media devices, also made by Apple Inc.

In various embodiments of the present disclosure a display cover is placed proximate to the viewing area of an associated display screen, which again can be any type of display screen used to present a visual display to a viewer. It will be readily appreciated that such a display cover can be separate from the display screen itself. In fact, such display covers are often used to provide additional protection and distance from the securely installed and specially treated glass or other substance that forms a front screen part of the CRT, LCD, plasma display or other display device. It will be readily appreciated that such a display cover may be separated from the display device itself, and that such a display cover may also be referred to as a cover glass, safety panel or other suitable designation. While such a display cover, cover glass or safety panel can typically be formed from glass, it will be understood that various types of plastics and/or other suitable transparent or translucent materials may alternatively be used to form the display cover or cover glass.

Figure 2:
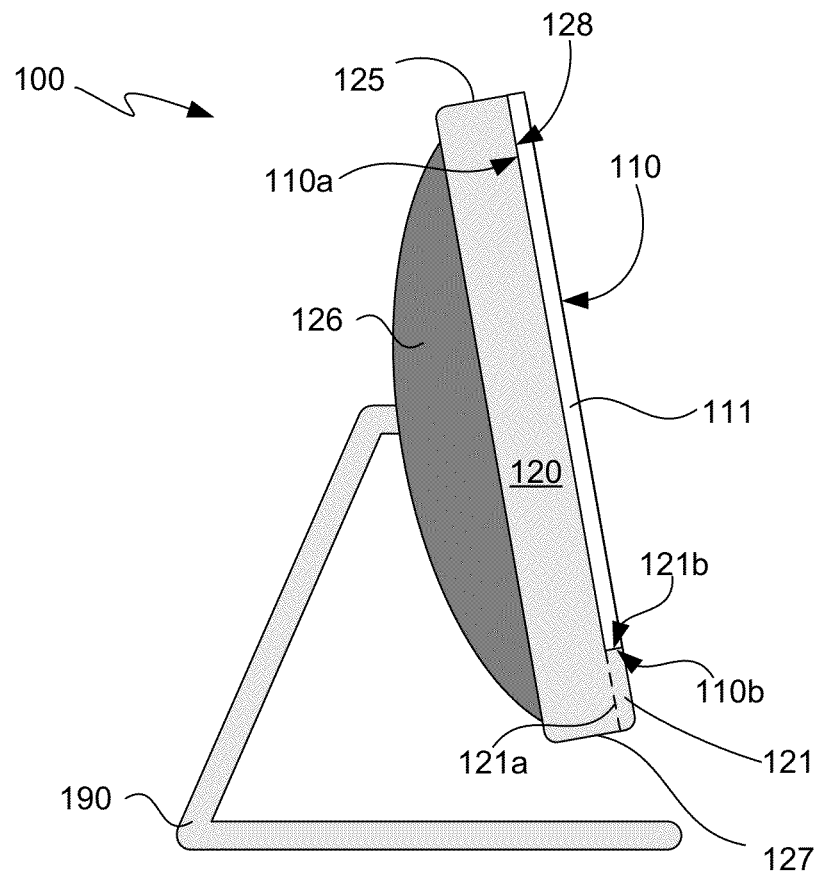
FIG. 2 illustrates a side view of the computing device of FIG. 1.

Referring first to FIGS. 1 and 2, an exemplary computing device having an oversized display screen presentation utilizing a display screen to housing interface according to one embodiment of the present disclosure is illustrated in front elevation and side elevation views respectively. Computing device 100 can be a desktop computer or associated monitor as shown, although various other devices having the distinctive display to housing interface disclosed herein may also be used. The computing device 100 can have a display cover 110 disposed with respect to an outer computer housing 120. Display cover 110 is preferably placed proximate to and in front of a display device 130 that is enclosed within computer housing 120. Computer housing 120 can also enclose various other computer components, such as a microprocessor (not shown) coupled to the display device 130, as well as one or more memory or storage units, speakers, additional displays or indicators, buttons or other input devices, video cards, sound cards, power inlets, various ports, and the like. Alternatively, the depicted computing device 100 may only include a monitor, terminal or other simple display unit, with any associated processors or other computing components being located away from the depicted display device.

A stand 190 or other similar structure can be used to support the entire computing device 100. Further, the computer housing 120 can have a frontally offset bottom chin portion or region referred to herein as a base member 121 that borders a bottom side edge of the display cover 110. The base member 121 can be entirely or substantially monochromatic, and may have a logo 123 or other contrasting symbol or display disposed thereupon. In addition, computer housing 120 can also have one or more side walls 124 and a top wall 125 that extend backwards from the front face of computing device 100, as well as a back wall 126 (see, e.g., FIG. 2). Such a back wall 126 may have some amount of curvature to it in various directions, and computer housing 120 may form a single integrated unit including base member 121, side walls 124, top wall 125, bottom wall 127, and back wall 126, as will be readily appreciated.

In another embodiment the base member 121 may be a separate component that is attached to the side walls 124 and bottom wall 127 along line 121*a* (see, FIG. 2) to the computer housing 120. In this regard, for example, the base member 121 may be welded (e.g., laser welded or friction stir welded) to the computer housing 120 at the sidewalls 124 and the bottom wall 127. Accordingly, in one example embodiment, the base member 121 may be attached to the computer housing 120 by welding three edges of the base member to the computer housing.

As illustrated in FIG. 2, the display cover 110 can be relatively thin in nature, and preferably has a front face that is exposed to the outside of computing device 100, an obverse face that is placed proximate to display device 130 and is thus inside of the computing device, and a distal edge portion 111 between the front and obverse faces and around an outer circumference of the display cover. This distal edge or edge portion 111 essentially reflects the thickness of the display cover 110 at its outer side or sides. Such a thickness of the edge portion at the outer edges can vary, and may even become zero at some locations, such as in the case of a sharp edge to the cover glass. Although various embodiments are certainly possible, it is specifically contemplated that the thickness of this outer edge portion remains substantially constant around the full circumference of the display cover 110.

As illustrated, the computer housing 120 of computing device 100 generally does not have any raised frame or side walls that surround and support the top or side edges of display cover 110. As such, the distal edge portion or portions 111 of the display cover 110 are visible and fully exposed to the outside of the computing device 100, such that a user viewing the computing device directly from the side or top can easily see the respective exposed side or top distal edge portions of the display cover. The result is a distinctive "apparently floating" display cover appearance for the display arrangement specifically, and the overall computing device in general, that is aesthetically pleasing while remaining fully functional with respect to display presentation capabilities.

While this "apparently floating" display cover arrangement may provide a distinguished yet elegant and aesthetically pleasing presentation with respect to many conventional display screen presentations, such an arrangement still requires adequate support in various pertinent directions for the display cover. Although gluing, bonding or otherwise permanently affixing the display cover to various portions of the housing and/or display apparatus might present a simplistic solution to such support issues, a permanent affixing of the display cover can present a disadvantageous situation with respect to the display cover not being removable. Having a firmly secured and supported yet readily removable display cover is desirable for several reasons. For example, users may wish to be able to remove the display cover to clean its obverse face, such as where spills, cigarette smoke or other pollutants may have seeped into the device and stained or clouded the back or obverse side of the cover glass. In addition, a user may wish to replace or service the actual display assembly and/or various other components internal to the computer housing. Access thereto can be greatly enhanced, particularly where the computer housing defines a singular integrated unit having the opening for the display cover as its only large access opening. Thus, a removable display cover may be preferable.

Figure 3:
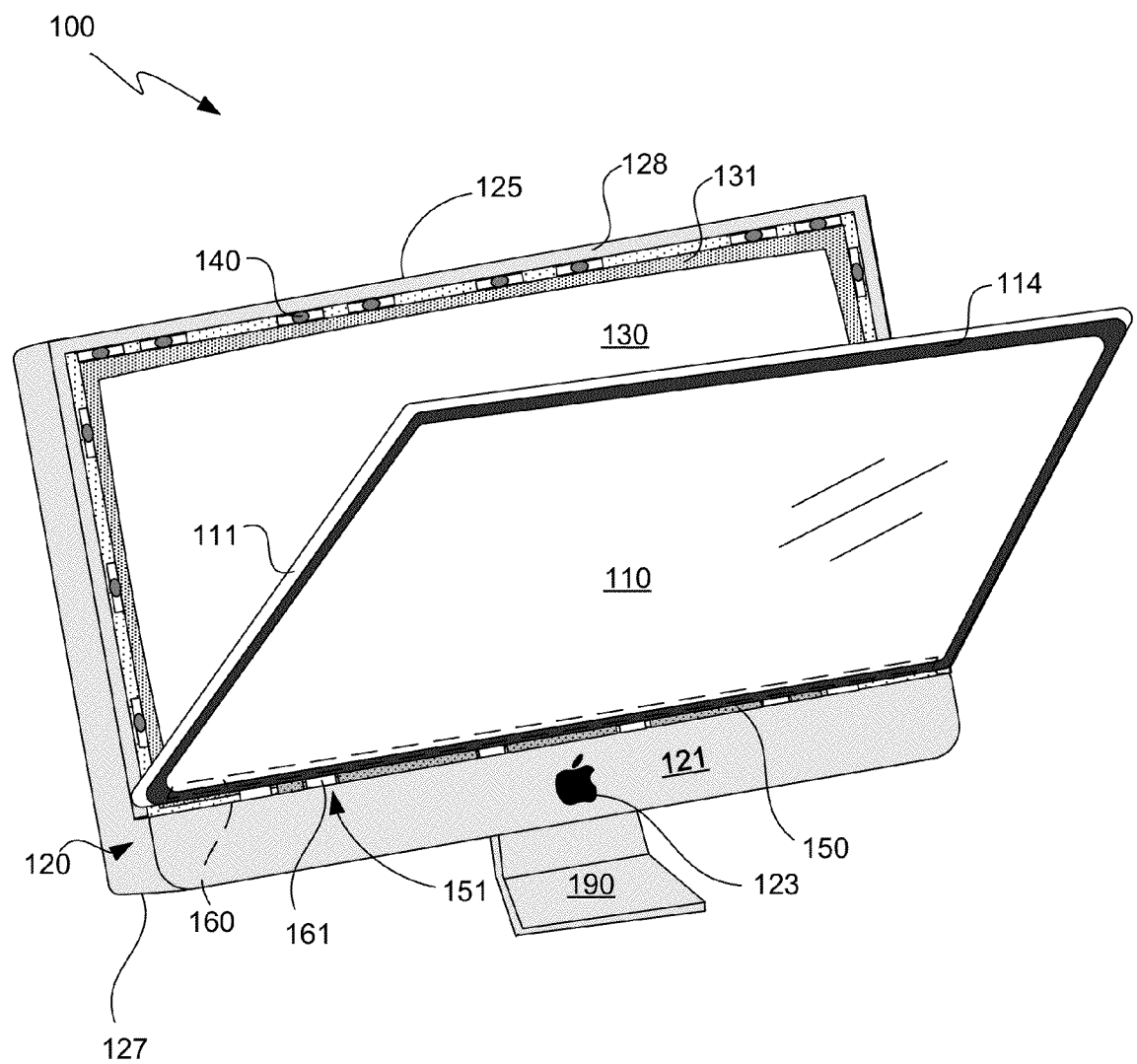
FIG. 3 illustrates a perspective partially-exploded view of the computing device of FIG. 1.

Moving next to FIG. 3, the exemplary computing device 100 of FIGS. 1 and 2 with its display cover 110 partially removed is shown in front elevation view. With the display cover 110 removed from computing device 100, the internal display screen 130 and its associated display device chassis or assembly 131 are exposed to the outside of the device via its front. Base member 121 remains at a set forward position with respect to the remainder of computer housing 120. Front facing distal edges 128 of side walls 124 and top wall 125 of computer housing 120 are visible from the front of computing device 100 with the display cover removed. As will be appreciated, particularly with respect to FIG. 1, the display cover 110 fronts and obscures these front distal edges 128 of side walls 124 and top wall 125 when the display cover is installed, such that these edges only become exposed when the display cover is removed. In fact, these front distal edges 128 are preferably not even visible in one embodiment when the display cover 110 is installed, due to a masking layer disposed on or about the display cover, as set forth in greater detail below.

Various support components can be used to secure and support the display cover 110 while it is installed. For example, magnets 140 can be disposed on or about the computer housing 120 and/or display device assembly 131, which magnets can be used to attract one or more metallic items disposed within or on the display cover 110 to hold the display cover in place. As shown in FIG. 3, eight magnets 140 may be positioned along a top edge of the display device assembly 131, while three magnets 140 may be positioned along both of the left and right sides of the display device assembly. Of course, a different number and/or size of magnets can be placed in any particular region, as may be desired. It is thought that having a greater number of magnets across the top may be desirable, as this is where it can be advantageous to have a greater attraction force with the display cover to prevent the display cover from pivoting along its bottom axis to fall away from the overall device.

Although not shown, such support magnets might also be provided on or about the top of base member 121 to correspond to a bottom edge of the display cover, as may be desired. In addition, or alternatively, a separate stabilizer assembly and associated components can be used to secure the bottom edge of the display cover. A toothed ledge 150 can be provided in order to engage a stabilizer assembly 160, which may be coupled to or integrally formed with the display cover 110. Ledge 150 may be integrally formed as a part of base member 121 and computer housing 120, or the ledge may be affixed or otherwise firmly coupled to the computer housing such that it does not move with respect to the housing. For example, ledge 150 may be affixed to and extend upward from the backside of base member 121, as set forth in greater detail below. Various gaps 151 can be provided within ledge 150 to enable engagement with the stabilizer assembly 160 associated with the display cover 110 when it is installed. In particular, the stabilizer assembly 160 can have a number of downward descending hooks 161 or other similar components configured to engage the gaps 151 in the ledge 150. As will be readily appreciated, lateral or side-to-side motion of the display cover 110 with respect to computer housing 120 can be restricted when one or more items coupled to the display cover, such as hooks 161 of the stabilizer assembly 160, are inserted into gaps 151 in ledge 150.

In order to mask or hide the various components coupled to the display cover 110, a masking layer 114 (see, e.g., FIGS. 1 and 3) may be provided on the display cover itself. The masking layer 114 can be a black or otherwise opaque ink that is printed or otherwise disposed onto the obverse face of the display cover 110 in the general shape of an outer frame. Of course, other items besides ink may be used for such a masking purpose. Alternative arrangements can include a masking layer that is separate from the cover glass itself, although such arrangements can be inferior or more cumbersome than a simple printed ink layer. Masking layer 114 can be formed on the front or back of the display cover 110 such that an opaque band is formed along some or all edges of the display cover. For example, a one to two inch wide black ink band from the edge inward and disposed around the entire circumference of obverse face display cover 110 may be suitable to hide or mask the magnets 140, stabilizer assembly 160 and any potentially visible portions of display screen assembly 131 that are not the actual display screen 130. Of course, other dimensions are also possible, and such a masking layer can be less than one inch or greater than two inches wide, as may be desired. In addition to hiding or masking any such unattractive items, masking layer 114 can provide an aesthetically pleasing "frame" or viewing portion through which much or all of the display screen 130 is visible.

As noted above, the front facing distal edges 128 of side walls 124 and top wall 125 of computer housing 120 abut the obverse face of display cover 110 proximate its outer edge, and the distal edge portion 111 abuts the base member 121. Accordingly, the tolerances for these items must be relatively tightly controlled in order to provide a close fit therebetween to achieve the above-described pleasing aesthetic effects. For example, improper tolerances at the distal edges 128 of the side walls 124 and/or top wall 125 of the computer housing 120 may result in the formation of gaps between the display cover 110 and the computer housing when the display cover is attached thereto. Although the resulting gaps may be relatively small, light seepage may occur between the display cover 110 and the computer housing 120 at the distal edges 128 of the side walls 124 and/or the top wall 125. Accordingly, a gap that may not be noticeable when the display screen 130 is turned off may appear relatively large during operation due to light escaping therethrough.

During the manufacture of the computer housing 120, the computer housing may initially be produced with dimensions differing from specified dimensions. For example, the computer housing 120 may be produced via computer numerical control (CNC) cutting, milling, etc., which may not perfectly produce the computer housing in accordance with the desired specifications in all instances. Further, the dimensions of the computer housing 120 may change from the specified dimensions during handling, shipping, etc. due to forces applied thereto during these processes.

Additionally, the computer housing 120 may be subjected to additional processing after the initial CNC manufacturing process. For example, the base member 121 may be coupled to the computer housing 120 via welding. In some embodiments base member 121 may be subjected to CNC milling or cutting after attachment to the computer housing 120 in order to exactly match the dimensions of the computer housing. Further, the housing 120 may be polished, sandblasted, anodized, and/or subjected to other finishing operations in some embodiments. Applicants have identified that the finishing operations may affect the dimensions of the computer housing 120. In particular, sandblasting may affect the dimensions of the computer housing 120. Thus, the computer housing 120 may not conform to specified dimensions for a variety of reasons, and accordingly, gaps between the computer housing and the display cover 110 may exist, as noted above.

Accordingly, Applicant herein provides methods and systems that may be employed to enhance the fit between the computer housing 120 and the display cover 110. For example, the methods and systems disclosed herein may be configured to adjust the shape and/or dimensions of the computer housing 120. However, as may be understood, the methods and systems disclosed herein may be employed to adjust the shape and/or dimensions of other components to meet desired parameters, and adjustment of the computer housing is provided herein for example purposes only.

Figure 4:
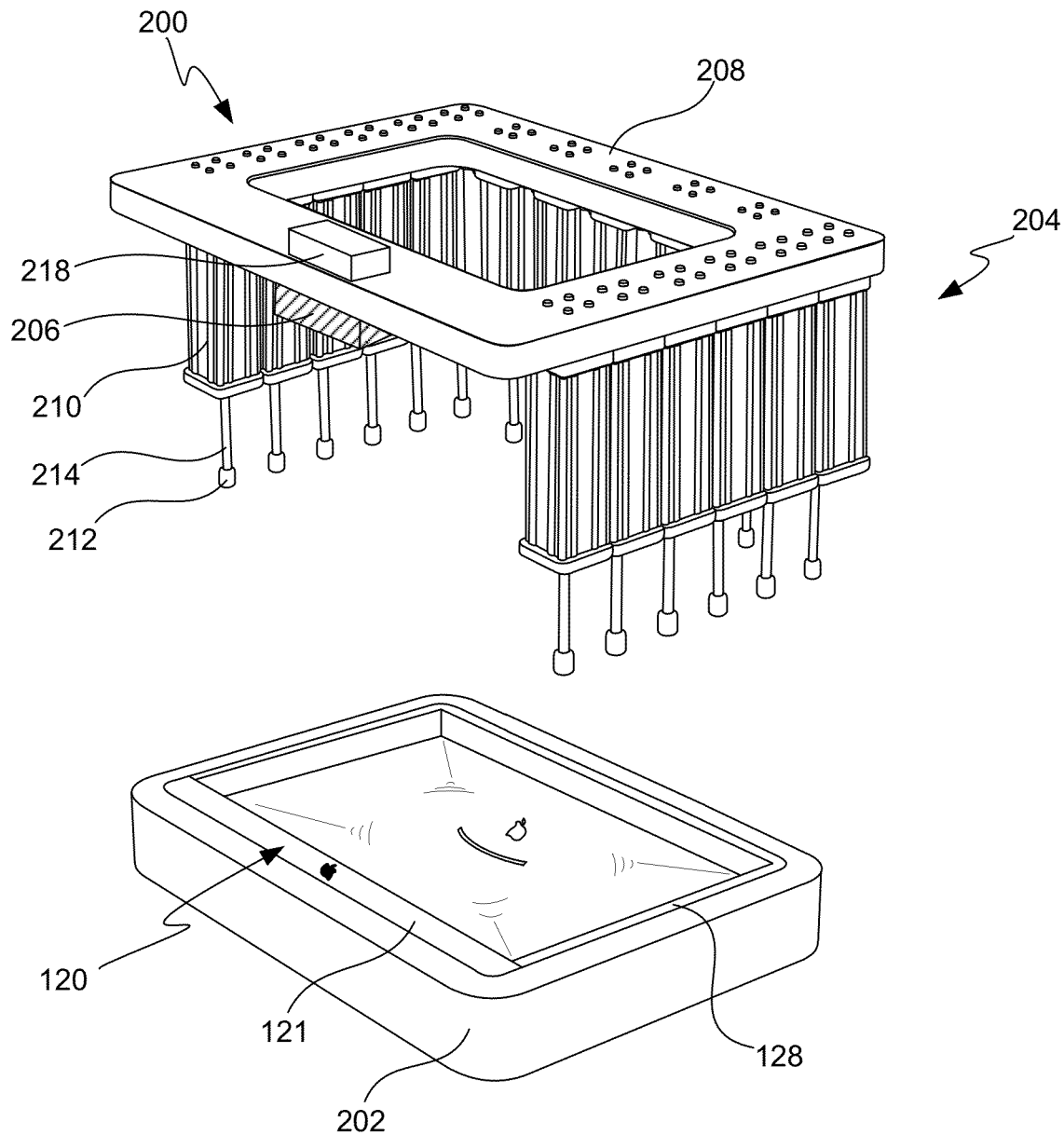
FIG. 4 illustrates a partially-exploded view of a system configured to adjust a shape of a computer housing by employing independent actuators to contact a portion of the computer housing being adjusted according to an example embodiment of the present disclosure.

In this regard, FIG. 4 illustrates an example embodiment of a system 200 configured to adjust a shape of a component. By way of example, the system 200 is illustrated as being employed to adjust the shape of the above-described computer housing 120. As illustrated, the computer housing 120 may be received in a corresponding fixture 202 configured to hold the computer housing (and/or other components). Further, the system 200 may include an adjustment apparatus 204 configured to apply a force to the computer housing 120 in order to adjust the shape of the computer housing. The fixture 202 and the adjustment apparatus 204 are separated from one another in FIG. 4 for clarity purposes.

The adjustment apparatus 204 may be configured to bring the computer housing 120 into compliance with desired specifications. In this regard, the system 200 may adjust the shape of the computer housing 120 at any point during or after manufacture of the computer housing. For example, as noted above, the computer housing 120 may be CNC machined, a base member 121 may be welded to the computer housing and CNC machined, the computer housing may be polished, the computer housing may be sandblasted, and/or the computer housing may be anodized. In one example embodiment, various operations may be performed on the computer housing 120, with the exception of the final anodizing operation, prior to adjustment of the computer housing with the system 200. Accordingly, after adjusting the computer housing 120 (e.g., by bringing any offset into a predetermined range of acceptable values, as will be described below), the computer housing may then be anodized. In this regard, anodizing may not significantly affect the shape of the computer housing 120, and anodizing after adjusting the shape of the computer housing may ensure that the final product includes an anodized finish free of cosmetic defects potentially caused by adjustment.

Further, by coupling the base member 121 to the computer housing 120 prior to applying force to the computer housing, the base member 121 may be brought into conformance with desired specifications. In this regard, Applicants have determined that when the base member 121 is welded to the computer housing 120, the base member may have a tendency to bow inwardly, particularly when welded on three sides as described above. However, by adjusting the shape of the computer housing 120 after the base member is attached thereto, the base member 121 may also be bent into the desired shape due to the coupling therebetween.

In order to determine the initial shape of the computer housing 120, the system 200 may include a measurement apparatus 206 configured to measure a position of a number of points on a portion of the computer housing. By way of example, the measurement apparatus 206 may include one or more laser or optical-based sensors configured to determine the position of points on the computer housing 120. However, various other types of sensors may be employed in other embodiments.

As illustrated in FIG. 4, in one embodiment the measurement apparatus 206 may be coupled to a frame 208 that supports actuators 210 configured to apply force to the computer housing 120. It should be noted that actuators 210 can be independent of each other and each controlled by separate controllers or independently controlled by a single controller. In this way, a greater variety of force can be applied concurrently. In another example embodiment the measurement apparatus 206 may be coupled to the fixture 202. In an additional example embodiment the actuators 210 may be configured to measure the position of points on the computer housing 120. For example, the actuators 210 may be configured to extend respective interface members 212 coupled to pistons 214 into contact with the computer housing 120 to determine the position of points on the computer housing.

Figure 5:
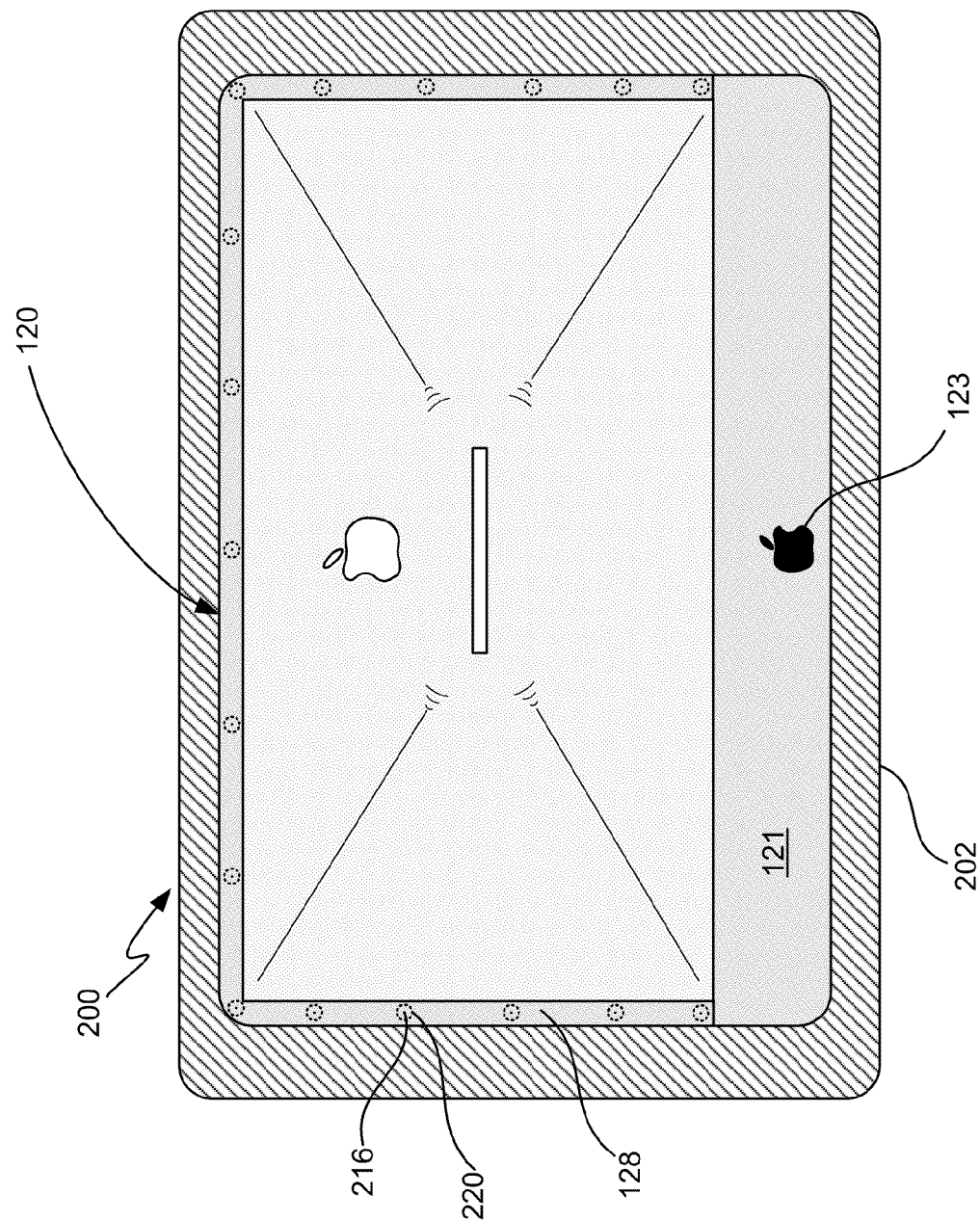
FIG. 5 illustrates an overhead view of a fixture of the system of FIG. 4.

In this regard, FIG. 5 illustrates an overhead view of the system 200 with the adjustment apparatus 204 removed for clarity purposes. As noted above, the system 200 may include a measurement apparatus 206 configured to measure a position of points on a portion of the computer housing 120. In one example embodiment the measurement apparatus 206 may be configured to measure the position of points 216 on the distal edges 128 of the computer housing 120.

Accordingly, by measuring the position of the points 216 on the computer housing 120 (e.g., the points 216 on the distal edge 128 of the computer housing), a determining apparatus may determine an offset between each of the positions and reference values corresponding to the desired positions of each of the points on the computer housing. As illustrated in FIG. 4, in one embodiment the determining apparatus 218 may be coupled to the frame 208. However, the determining apparatus 218 may be positioned at other locations in other embodiments, such as remotely from the adjustment apparatus 204.

As noted above, the adjustment apparatus 204 may be configured to apply force to the computer housing 120 based on the offset at each of the points 216 on the computer housing. In this regard, the determining apparatus 218 may be further configured to determine a displacement distance (e.g., stroke) of the actuator 210 configured to decrease the offset at each of the points 216 on the computer housing 120. Thus, in one embodiment the determining apparatus 218 may indirectly determine the force to be applied to the computer housing 120 by determining the distance along which each actuator 210 is to be displaced when applying force to the computer housing 120. In an alternate embodiment, the determining apparatus 218 may determine a force configured to decrease the offset for each of the points 216. In other words, the determining apparatus 218 may directly determine the appropriate force to apply to the computer housing 120, rather than determining the stroke of the actuators 210 in the second example embodiment.

Thereby, once the offsets are determined for each of the points 216 on the computer housing 120, the adjustment apparatus 204 may apply a force based on the offset with the actuators 210 at each of the points 216 on the computer housing 120. In one example embodiment, the actuators 210 may be solenoid actuators, pneumatic actuators, and/or hydraulic actuators. However, the actuators 210 may be other mechanisms configured to controllably exert force.

As illustrated in FIG. 5 in some embodiments the actuators 210 may be configured to apply force at areas 220 on the computer housing 120 corresponding to the points 216 at which the position is determined. For example, the pistons 214 and interface members 212 may be configured to align with the points 216 on the computer housing 120. However, in other embodiments the points 216 on the computer housing 120 at which the position is determined and the areas 220 at which the force is applied need not necessarily overlap.

In order to avoid damaging the computer housing 120, and in order to assist in adjusting the computer housing to meet the desired specifications, the interface members 212 may correspond to the shape of the computer housing. In this regard, in the embodiment of the system 200 illustrated in FIGS. 4 and 5, the interface members 212 define a flat bottom surface that corresponds to the flat distal edge 128 of the computer housing 120. In this regard, the flat distal edge 128 is a mating surface configured to mate with the flat display cover 110. In particular, the flat distal edge 128 of the computer housing 120 defines a primary mating surface configured to contact a major surface 110a of the display cover 110, and the base member 121 defines a secondary mating surface at an upper edge 121b that is configured to contact a lower edge portion 110b of the display cover (see, FIG. 2). Accordingly, the interface between the major surface 110a of the display cover 110 and the distal edge 128 of the computer housing 120 may be of primary importance in order to avoid light leakage therebetween, whereas the interface between the lower edge portion 110b of the display cover 110 and the upper edge 121b of the base member 121 may be of secondary importance due to base member substantially preventing the occurrence of light leakage at this interface.

As described above with respect to FIGS. 4 and 5, in some embodiments the system 200 may be configured to directly contact a mating surface of the object being adjusted with the actuators 210. However, in another embodiment a system may be configured to employ actuators to apply force to non-mating surfaces. In this regard, FIGS. 6 and 7 illustrate an example embodiment of such a system in which like components are referenced with like reference numerals relative to the system 200 of FIGS. 4 and 5.

Figure 6:
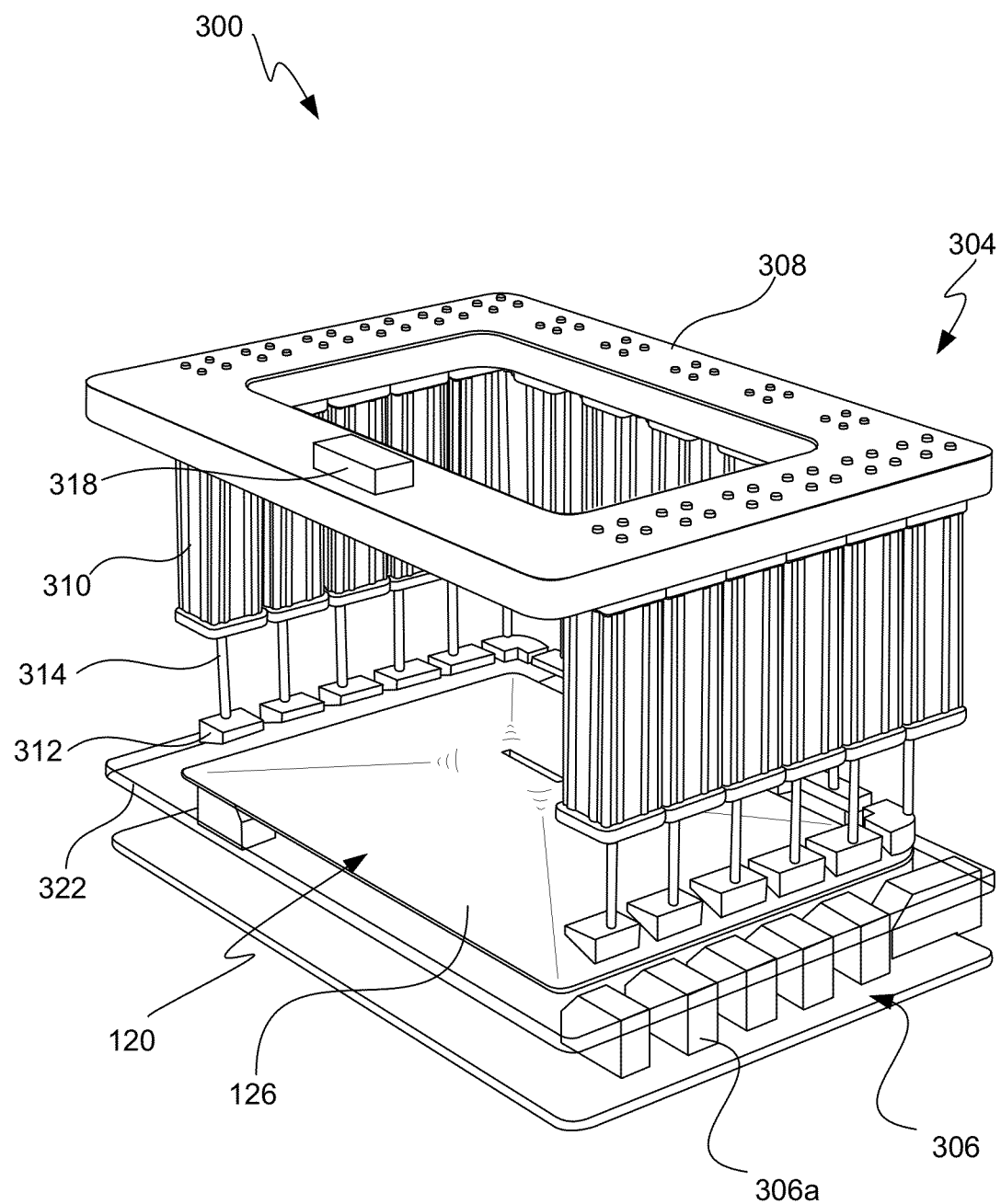
FIG. 6 illustrates a system configured to adjust a shape of a computer housing by employing independent actuators to contact a portion of the computer housing opposing the portion of the computer housing being adjusted according to an example embodiment of the present disclosure.
Figure 7:
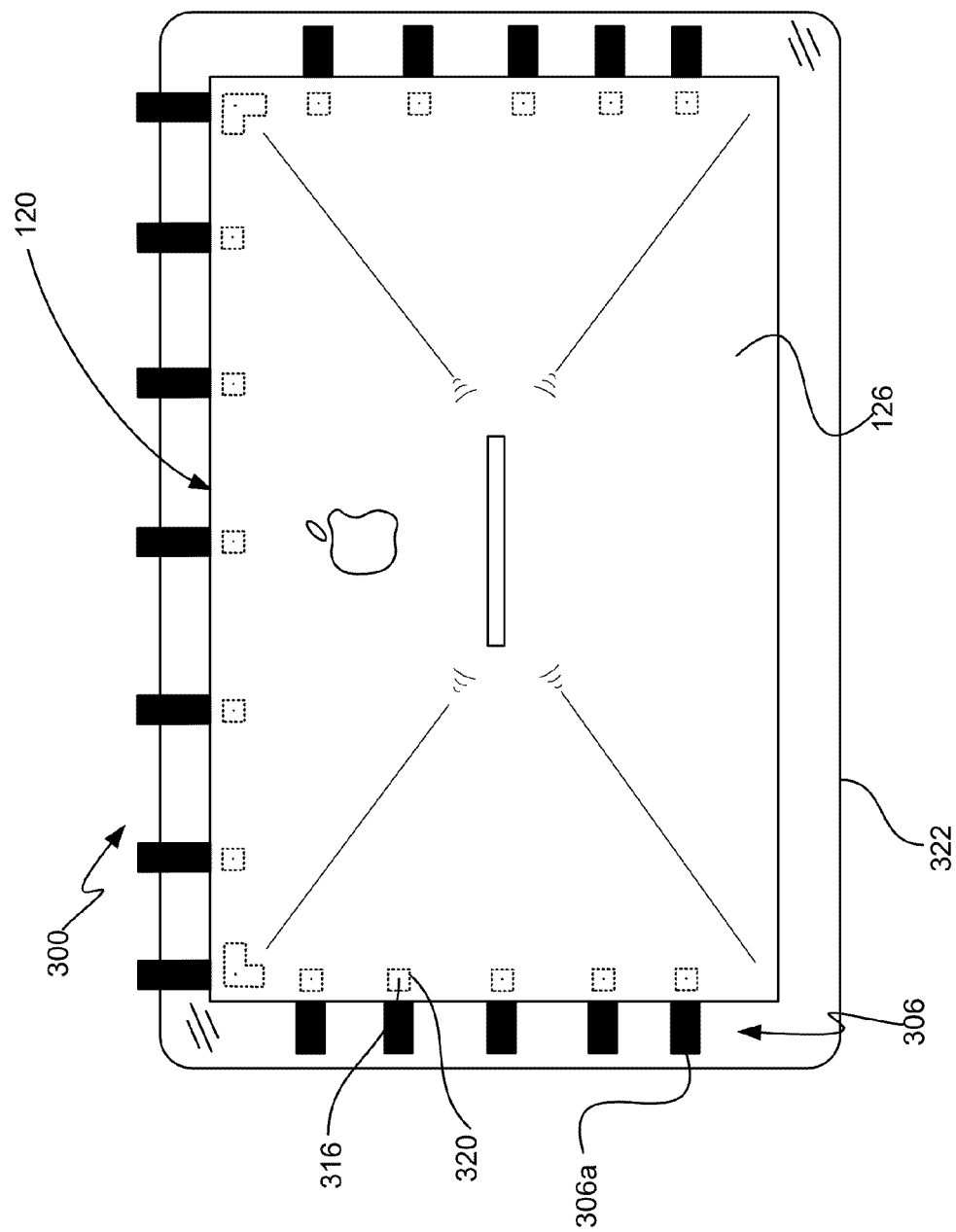
FIG. 7 illustrates an overhead view of an alignment member of the system of FIG. 6.

In this regard, the system 300 of FIGS. 6 and 7 is configured to employ the actuators 310, which may be coupled to a frame 308, to contact the back wall 126 of the computer housing 120 and apply force thereto. As illustrated, the back wall 126 of the computer housing 120 is curved. Accordingly, the interface members 312 attached to the pistons 314 define curved contact surfaces that correspond to the shape of the back wall 126 of the computer housing 120.

Since the actuators 310 are configured to apply force to a surface (the back wall 126) that opposes the distal edges 128 of the computer housing 120, the system 300 may include other features that differ from the system 200 of FIGS. 4 and 5. In this regard, the system 300 may include an alignment member 322. The adjustment apparatus 304 may be configured to compress the computer housing 120 against the alignment member 322 to thereby apply force to the front of the computer housing 120 at the distal edges 128 thereof. Note that in FIG. 6, the adjustment apparatus is illustrated in a raised configuration prior to actuation of the actuators 310, which contact the computer housing 120.

Further, the measurement apparatus 306 may be configured to measure the position of the points 316 on the computer housing through the alignment member 322. In this regard, by way of example, the alignment member 322 may be formed from glass, and the measurement apparatus 306 may include one or more sensors 306a that employ lasers to measure the position of the points 316 on the distal edge 128 through the alignment member. In another embodiment the alignment member 322 may define holes through which the sensors 306a measure the position of the points. Further, various other embodiments and types of sensors may be employed in other embodiments, as noted above. Accordingly, the measurement apparatus 306 may measure the positions of the points 316, the determining apparatus 318 may determine the offsets between the positions and reference values for the desired configuration, and the adjustment apparatus 304 may employ the actuators 310 to compress the computer housing 120 against the alignment member 322 to thereby apply force to the distal edge 128 of the computer housing based on the offset at each of the points.

Thus, in each of the embodiments of the systems 200, 300 disclosed herein force may be applied to areas 220, 320 on the computer housing 120 (or other component) to adjust the shape thereof based on offsets at points 216, 316 thereon. By applying force to the computer housing 120 based on the offsets (e.g., by applying greater force at areas having greater offsets, and lesser or no force at areas having lesser offsets), the offsets may be reduced or eliminated. In this regard, the force may be applied so as to plastically deform the computer housing 120.

Figure 8:
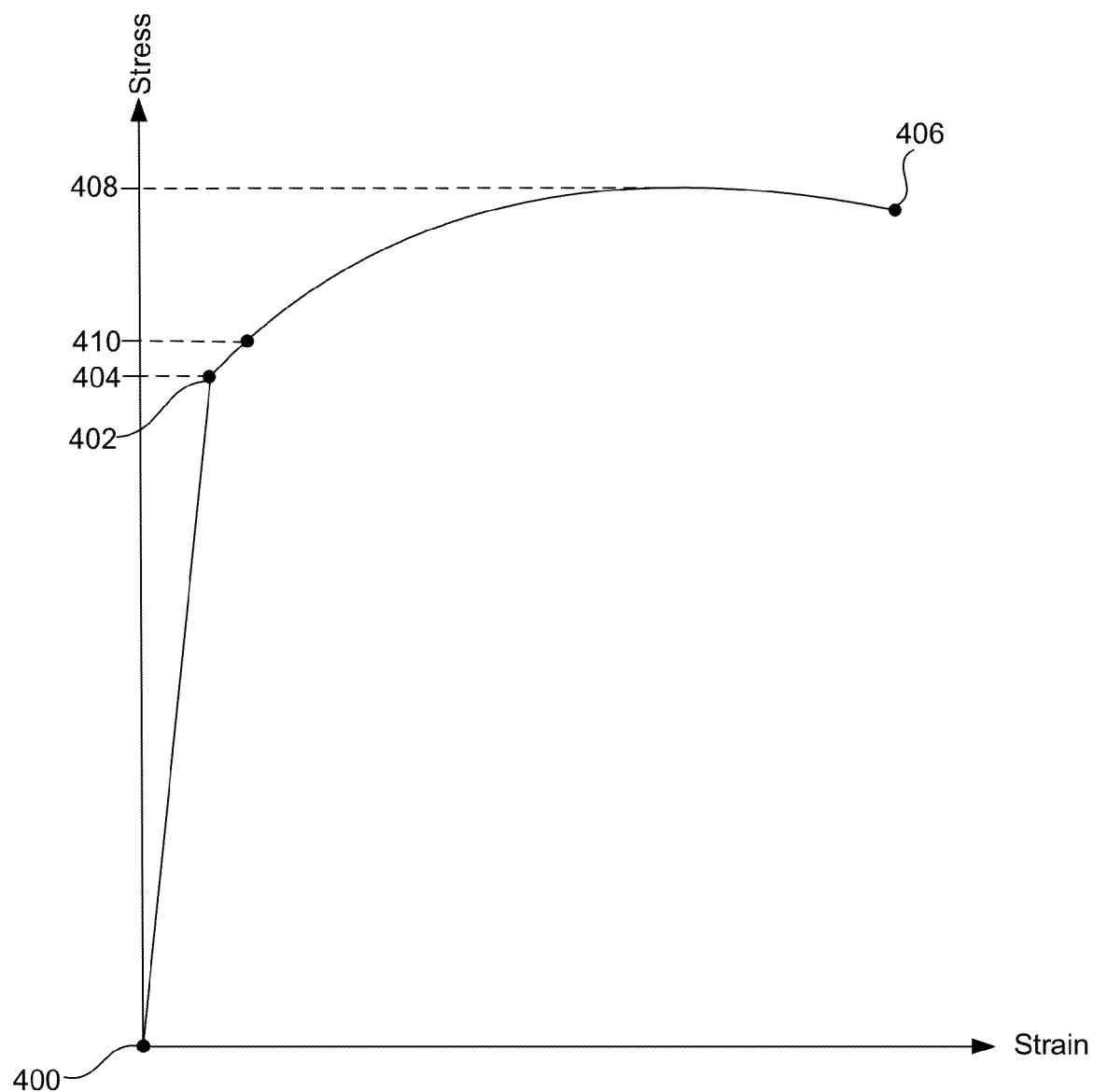
FIG. 8 illustrates a stress-strain curve of a material defining a computer housing according to an example embodiment of the present disclosure.

In order to plastically deform the computer housing 120, the force may be applied to the computer housing for an amount of time sufficient to insure that the computer housing does not elastically return to the original offset configuration. However, it may be desirable to limit the stress applied to the computer housing 120. In this regard, FIG. 8 illustrates an example stress-strain curve for the material defining the computer housing 120, which may be formed from a metal such as aluminum. Point 400 illustrates an initial starting point for the material prior to applying force thereto. As illustrated, when force is applied, the material may initially elastically deform until the yield point 402 is reached. The yield point 402 is the point at which the stress level reaches a yield stress 404, and thereafter the material would plastically deform with the addition of more force until a rupture point 406 is reached.

Accordingly, to avoid breaking the computer housing 120, the stress should be kept below the ultimate strength 408 of the material. Further, it may be desirable to keep the stress applied to the material from exceeding an intermediate level of stress 410 to avoid deforming the back wall 126 of the computer housing 120. For example, the applied force may be configured to induce stress up to about 105%, up to about 110%, up to about 115%, up to about 120%, or up to about 125% of the yield stress 404 of the computer housing 120.

Accordingly, the above-described embodiments of the systems 200, 300 may plastically deform the computer housing 120 such that the offset between the position of the points 216, 316 on the computer housing and the desired reference values may be reduced to fall within a predetermined range of acceptable values. In some embodiments, the measurement apparatus, the determining apparatus, and the adjustment apparatus may be configured to respectfully measure the position of the points, determine the offset, and apply the force sequentially. For example, the system 200 illustrated in FIGS. 4 and 5 may be configured to conduct these operations sequentially, since the interface members 212 contact the computer housing 120 at areas 220 that overlap with the points 216 at which the measurement apparatus 206 measures the position of the computer housing. Accordingly, in embodiments in which the measurement apparatus 206 employs optical or laser-based measurement sensors, the sensors may not be able to determine the position of the points 216 on the computer housing 120 when the interface members 212 are applying force to the computer housing. Thus, the measurement apparatus 206 may measure the position of the points 216 on the computer housing 120, the determining apparatus 218 may determine the offset relative to reference values, and the adjustment apparatus 204 may apply force to the computer housing in order to reduce the offset. This process may then be repeated iteratively, if necessary, until each of the offsets falls with a predetermined range of acceptable values.

However, in other embodiments the measurement apparatus, the determining apparatus, and the adjustment apparatus may be configured to respectfully measure the position of the points, determine the offset, and apply the force concurrently. For example, the embodiment of the system 300 illustrated in FIGS. 6 and 7 is configured such that the adjustment apparatus 304 applies force to the computer housing 120 using actuators 310 that contact areas 320 on the back wall 126 of the computer housing, whereas the measurement apparatus 306 measures the position of the points 316 on the opposing distal edges 128 of the computer housing. Accordingly, the measurement apparatus 306 may continue to measure the position of the points 316 on the computer housing 120 while the actuators 310 are applying force to the computer housing. Thus, in this embodiment, the force applied may be adjusted based on changes in the position of the points 316 on the computer housing 120 during application of the force, which may be beneficial in that it may allow for more rapid adjustment of the computer housing.

Figure 9:
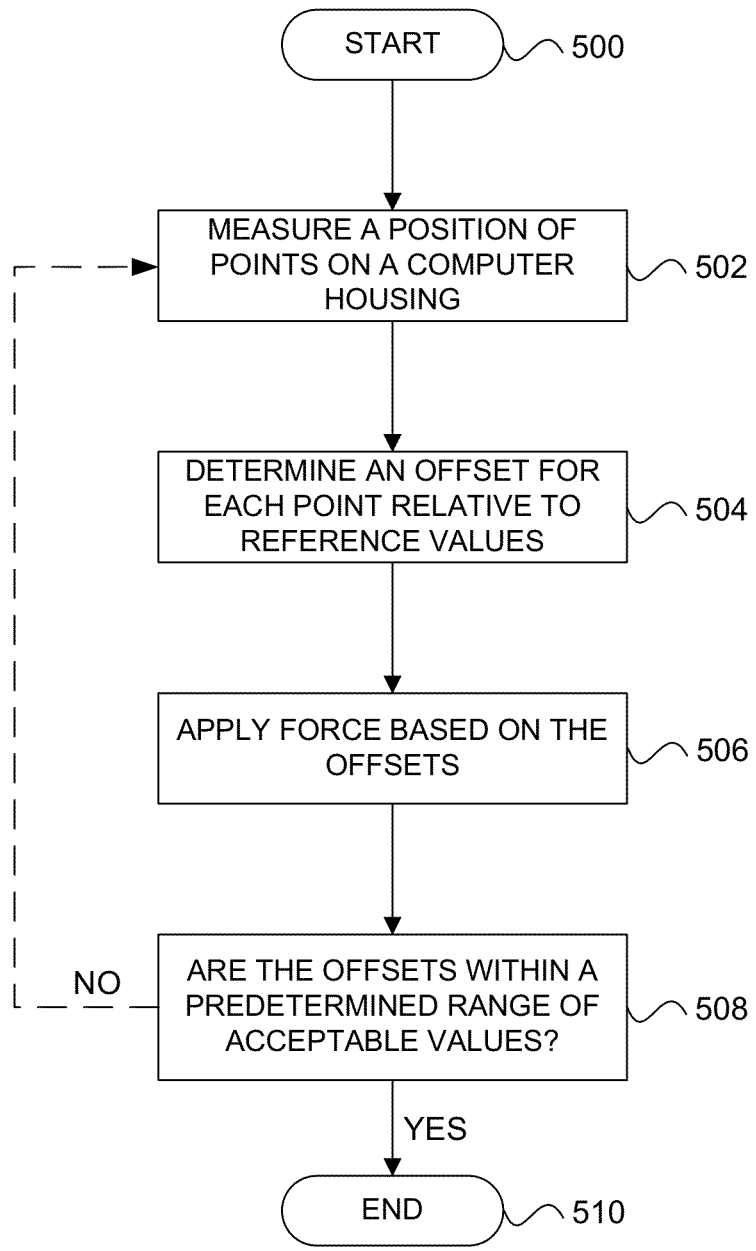
FIG. 9 illustrates a flowchart of an example method for adjusting a shape of a computer housing according to an example embodiment of the present disclosure.
Figure 10:
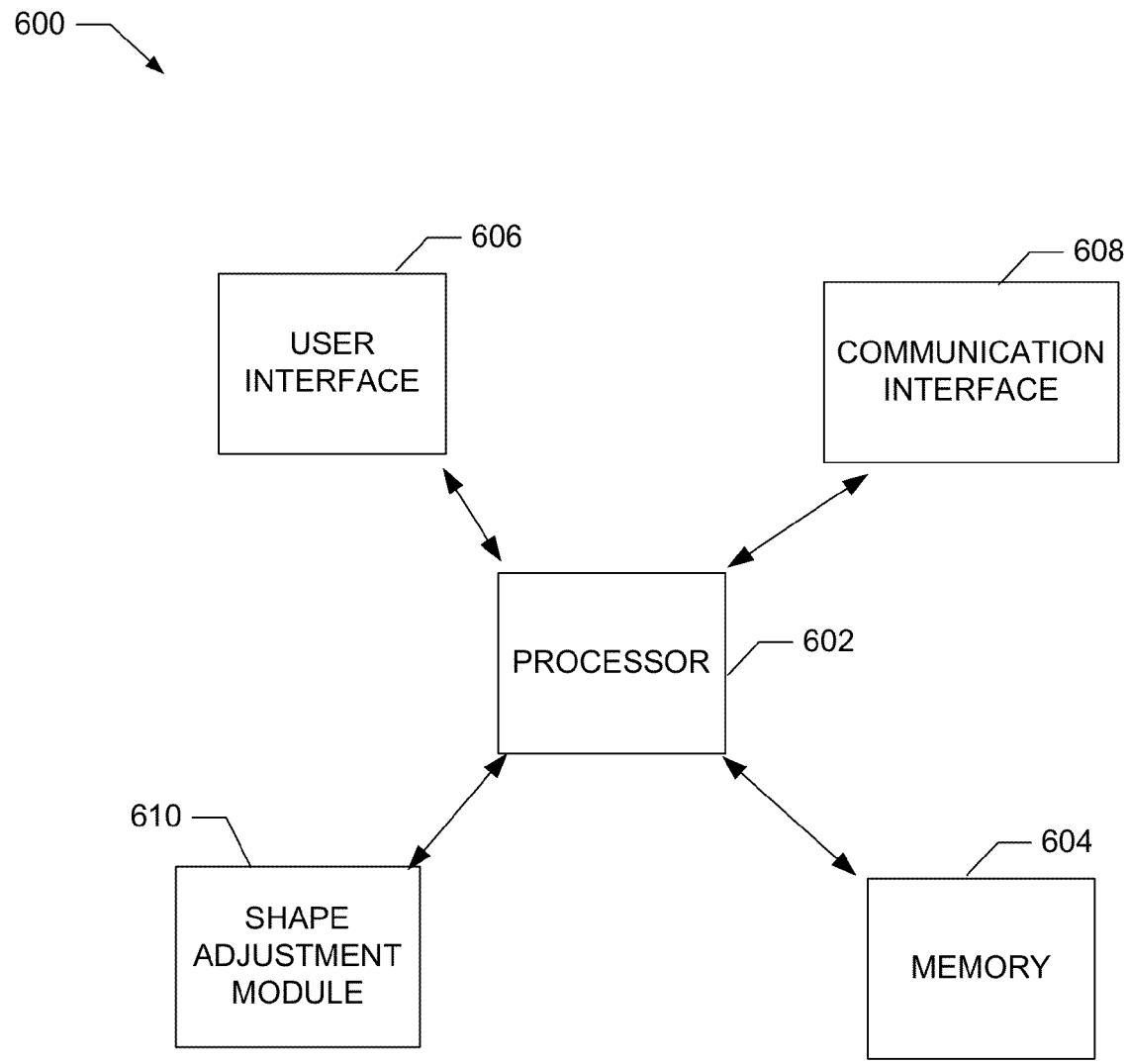
FIG. 10 illustrates a block diagram of an electronic device according to an example embodiment of the present disclosure

As illustrated in FIG. 9, a related method for adjusting the shape of a computer housing is also provided. As illustrated, the method may start at step 500. At step 502, the method may include measuring a position of points on a portion of a computer housing. Further, the method may include determining an offset between the position and a reference value for each of the points at step 504. The method may also include applying a force based on the offset with an actuator at each of the points on the portion of the computer housing for an amount of time at step 506. Further, as illustrated at step 508, measuring the position, determining the offset, and applying the force may be conducted until the offset is within a predetermined range of acceptable values. Once the offset is within a predetermined range of acceptable values, the method may end at step 510.

In various embodiments of the method, applying the force at step 506 may include plastically deforming the computer housing. Plastically deforming the computer housing may include inducing a stress up to about 105%, up to about 110%, up to about 115%, up to about 120%, or up to about 125% of a yield stress of the computer housing. Further, applying the force based on the offset at step 506 may include determining a displacement distance of the actuator configured to decrease the offset at each of the points and/or determining the force configured to decrease the offset at each of the points.

In some embodiments measuring the position at step 502, determining the offset at step 504, and applying the force at step 506 are conducted concurrently, whereas in other embodiments these steps are conducted sequentially. The method may further include coupling a base member to the computer housing prior to applying the force, and the computer housing may define a primary mating surface configured to contact a major surface of a mating object and the base member may define a secondary mating surface configured to contact an edge surface of the mating object. The method may also include inserting the computer housing in a fixture.

Additionally, the actuator that applies the force at step 506 may be configured to contact a mating surface defined by the computer housing. In another embodiment the actuator may be configured to contact a non-mating surface. The method may also include anodizing the computer housing after the offset is within the predetermined range of acceptable values.

FIG. 11 is a block diagram of an electronic device 600 suitable for use with the described embodiments. In one example embodiment the electronic device 600 may be embodied in or as a controller for the above-described systems 200, 300. In this regard, the electronic device 600 may be configured to control or execute the above-described shape adjustment operations.

The electronic device 600 illustrates circuitry of a representative computing device. The electronic device 600 may include a processor 602 that may be microprocessor or controller for controlling the overall operation of the electronic device 600. In one embodiment the processor 602 may be particularly configured to perform the functions described herein. The electronic device 600 may also include a memory device 604. The memory device 604 may include non-transitory and tangible memory that may be, for example, volatile and/or non-volatile memory. The memory device 604 may be configured to store information, data, files, applications, instructions or the like. For example, the memory device 604 could be configured to buffer input data for processing by the processor 602. Additionally or alternatively, the memory device 604 may be configured to store instructions for execution by the processor 602.

The electronic device 600 may also include a user interface 606 that allows a user of the electronic device 600 to interact with the electronic device. For example, the user interface 606 can take a variety of forms, such as a button, keypad, dial, touch screen, audio input interface, visual/image capture input interface, input in the form of sensor data, etc. Still further, the user interface 606 may be configured to output information to the user through a display, speaker, or other output device. A communication interface 608 may provide for transmitting and receiving data through, for example, a wired or wireless network such as a local area network (LAN), a metropolitan area network (MAN), and/or a wide area network (WAN), for example, the Internet.

The electronic device 600 may also include a shape adjustment module 610. The processor 602 may be embodied as, include or otherwise control the shape adjustment module 610. The shape adjustment module 610 may be configured for controlling or executing shape adjustment operations including the shape adjustment operations described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling shape adjustment operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Thus, a non-transitory computer readable medium for storing computer instructions executed by a processor in a controller for controlling a system configured to adjust a shape of a computer housing is provided. The non-transitory computer readable medium may include computer code for measuring a position of points on a portion of a computer housing, computer code for determining an offset between the position and a reference value for each of the points, and computer code for applying a force based on the offset with an actuator at each of the points on the portion of the computer housing for an amount of time. The computer code for measuring the position, the computer code for determining the offset, and the computer code for applying the force may be configured to be executed until the offset is within a predetermined range of acceptable values. Further, the computer code for applying the force may include computer code for determining a displacement distance of the actuator configured to decrease the offset at each of the points. Also, the computer code for applying the force may include computer code for determining the force configured to decrease the offset at each of the points.

Although the systems, assemblies, methods, and non-transitory computer readable medium disclosed herein have generally been described in terms of adjusting computer housings, it should be understood that the systems, assemblies, methods, and non-transitory computer readable medium may be employed to adjust the shape of other components of a computer and components that do not define a portion of a computer.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A method for adjusting a shape, comprising:
measuring a position of a plurality of points on a portion of a computer housing;
determining an offset between the position and a reference value for each of the points; and
applying a force based on the offset with an actuator at each of the points on the portion of the computer housing for an amount of time,
wherein measuring the position, determining the offset, and applying the force are conducted until the offset is within a predetermined range of acceptable values.

2. The method of claim 1, wherein applying the force comprises plastically deforming the computer housing.

3. The method of claim 2, wherein plastically deforming the computer housing comprises inducing a stress up to about 105% of a yield stress of the computer housing.

4. The method of claim 1, wherein applying the force based on the offset comprises determining a displacement distance of the actuator configured to decrease the offset at each of the points.

5. The method of claim 1, wherein applying the force based on the offset comprises determining the force configured to decrease the offset at each of the points.

6. The method of claim 1, wherein measuring the position, determining the offset, and applying the force are conducted concurrently.

7. The method of claim 1, wherein measuring the position, determining the offset, and applying the force are conducted sequentially.

8. The method of claim 1, further comprising coupling a base member to the computer housing prior to applying the force, wherein the computer housing defines a primary mating surface configured to contact a major surface of a mating object and the base member defines a secondary mating surface configured to contact an edge surface of the mating object.

9. The method of claim 1, further comprising inserting the computer housing in a fixture.

10. The method of claim 1, wherein the actuator is configured to contact a mating surface defined by the computer housing.

11. The method of claim 1, wherein the actuator is configured to contact a non-mating surface.

12. The method of claim 1, further comprising anodizing the computer housing after the offset is within the predetermined range of acceptable values.

13. A system configured to adjust a shape, the system comprising:
a measurement apparatus configured to measure a position of a plurality of points on a portion of a computer housing;
a determining apparatus configured to determine an offset between the position and a reference value for each of the points; and
an adjustment apparatus configured to apply a force based on the offset with an actuator at each of the points on the portion of the computer housing for an amount of time,
wherein the measurement apparatus, the determining apparatus, and the adjustment apparatus are respectively configured to measure the position, determine the offset, and apply the force until the offset is within a predetermined range of acceptable values.

14. The system of claim 13, further comprising a fixture configured to hold the computer housing.

15. The system of claim 13, wherein each actuator is independent of and controlled separately from other actuators, and
wherein each actuator comprises an interface member configured to correspond to the shape of the computer housing.

16. The system of claim 13, wherein the measurement apparatus comprises a laser.

17. The system of claim 13, wherein each actuator comprises a pneumatic actuator.

18. The system of claim 13, wherein each actuator comprises a solenoid actuator.

19. The system of claim 13, further comprising an alignment member, wherein the adjustment apparatus is configured to compress the computer housing against the alignment member, and the measurement apparatus is configured to measure the position of the points on the portion of the computer housing through the alignment member.

20. The system of claim 19, wherein the alignment member comprises glass.

21. A non-transitory computer readable medium for storing computer instructions executed by a processor in a controller for controlling a system configured to adjust a shape, the non-transitory computer readable medium comprising:
  computer code for measuring a position of a plurality of points on a portion of a computer housing;
  computer code for determining an offset between the position and a reference value for each of the points; and
  computer code for applying a force based on the offset with an actuator at each of the points on the portion of the computer housing for an amount of time,
  wherein the computer code for measuring the position, the computer code for determining the offset, and the computer code for applying the force are configured to be executed until the offset is within a predetermined range of acceptable values.

22. The non-transitory computer readable medium of claim 21, wherein the computer code for applying the force comprises computer code for determining a displacement distance of the actuator configured to decrease the offset at each of the points.

23. The non-transitory computer readable medium of claim 21, wherein the computer code for applying the force comprises computer code for determining the force configured to decrease the offset at each of the points.

24. The non-transitory computer readable medium of claim 21, wherein each actuator is independent of and controlled separately from other actuators.

* * * * *